US010612937B2

(12) United States Patent
Takatani et al.

(10) Patent No.: US 10,612,937 B2
(45) Date of Patent: Apr. 7, 2020

(54) INFORMATION PROCESSING DEVICE AND METHOD

(71) Applicant: Kabushiki Kaisha Toshiba, Minato-ku (JP)

(72) Inventors: Tsuyoshi Takatani, Kawasaki (JP); Tsuyoshi Tasaki, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 425 days.

(21) Appl. No.: 15/440,388

(22) Filed: Feb. 23, 2017

(65) Prior Publication Data

US 2017/0356756 A1    Dec. 14, 2017

(30) Foreign Application Priority Data

Jun. 14, 2016 (JP) ................................. 2016-117705

(51) Int. Cl.
*G01C 22/00* (2006.01)
*G06T 7/246* (2017.01)
(Continued)

(52) U.S. Cl.
CPC ............... *G01C 22/00* (2013.01); *G01C 3/08* (2013.01); *G01C 19/5776* (2013.01);
(Continued)

(58) Field of Classification Search
CPC ..................................................... G01C 22/00
See application file for complete search history.

(56) References Cited

U.S. PATENT DOCUMENTS 9,031,782 B1    5/2015 Lemay et al.
2010/0292915 A1 *  11/2010 Ishigami ................ G01C 21/26
701/532
(Continued)

FOREIGN PATENT DOCUMENTS

EP    1 906 140 A2    4/2008
JP    2008-128793 A    6/2008
(Continued)

OTHER PUBLICATIONS

Brian Williams, et al. "Feature and Pose Constrained Visual Aided Inertial Navigation for Computationally Constrained Aerial Vehicles", IEEE International Conference on Robotics and Automation, 2011, pp. 431-438.

(Continued)

*Primary Examiner* — Manuel A Rivera Vargas
(74) *Attorney, Agent, or Firm* — Oblon, McClelland, Maier & Neustadt, L.L.P.

(57) ABSTRACT

According to an embodiment, an information processing device includes an internal sensor, a first derivation unit, a second derivation unit, a reliability calculation unit, a movement amount calculation unit. The internal sensor monitors monitor information including acceleration of a moving object. The first derivation unit derives a first movement amount of the moving object from the monitor information. The second derivation unit derives a second movement amount of the moving object using surrounding information of the moving object monitored by an external sensor. The reliability calculation unit calculates reliability of the second
(Continued)

movement amount. The movement amount calculation unit calculates a current movement amount of the moving object using the first movement amount and the second movement amount when the reliability meets a specific criterion, and calculates the first movement amount as the current movement amount when the reliability does not meet the specific criterion.

20 Claims, 9 Drawing Sheets

(51) Int. Cl.
*G06T 7/73* (2017.01)
*G01C 3/08* (2006.01)
*G01C 19/5776* (2012.01)

(52) U.S. Cl.
CPC ............... *G06T 7/248* (2017.01); *G06T 7/73* (2017.01); *G06T 2207/30252* (2013.01)

(56) References Cited

U.S. PATENT DOCUMENTS

| | | |
|---|---|---|
| 2012/0121161 A1 | 5/2012 | Eade et al. |
| 2014/0260517 A1* | 9/2014 | Demerly ............... G01P 21/00 73/1.38 |
| 2016/0154408 A1 | 6/2016 | Eade et al. |
| 2017/0345161 A1 | 11/2017 | Takatani et al. |

FOREIGN PATENT DOCUMENTS

| | | |
|---|---|---|
| JP | 2010-151459 A | 7/2010 |
| JP | 2014-222550 | 11/2014 |
| JP | 2017-215193 A | 12/2017 |

OTHER PUBLICATIONS

Anastasios I. Mourikis, et al. "A Multi-State Constraint Kalman Filter for Vision-aided Inertial Navigation", IEEE International Conference on Robotics and Automation, 2007, pp. 3565-3572.

* cited by examiner

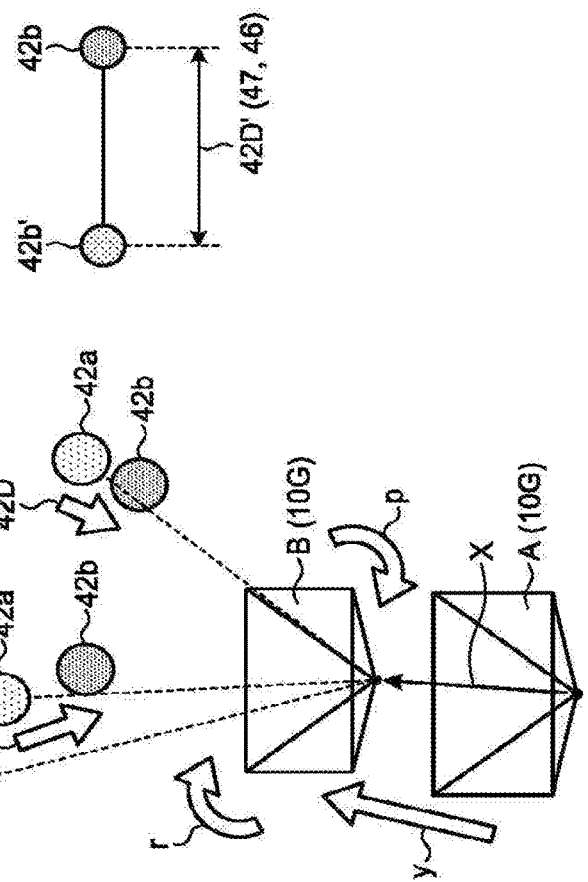
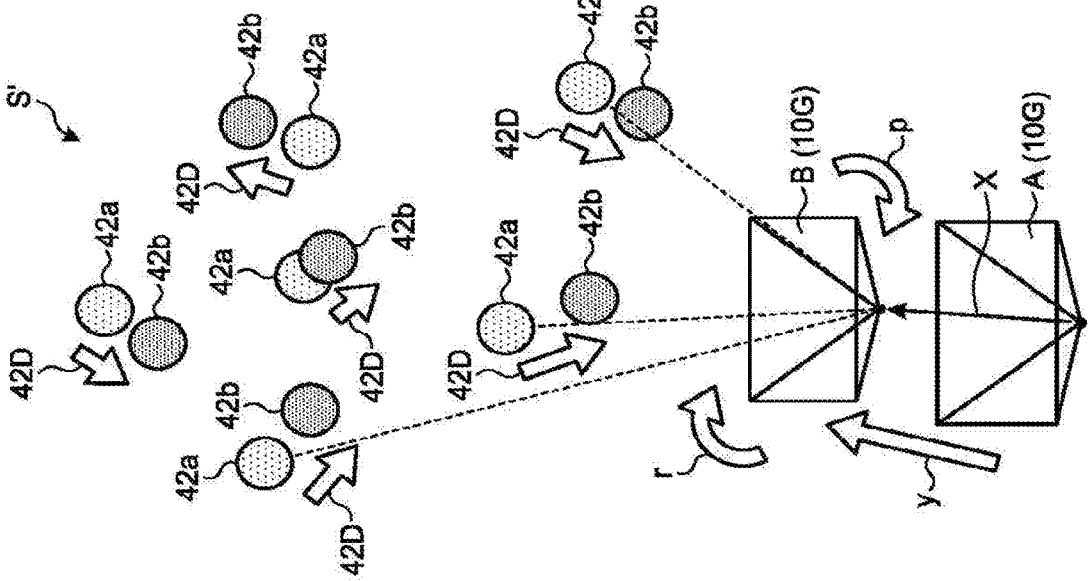
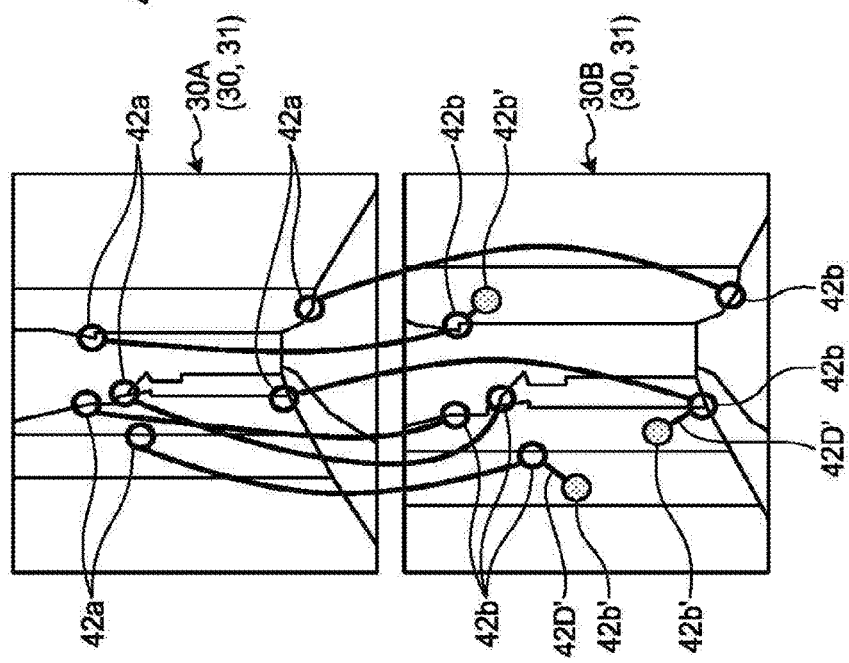

FIG.6A

```
                              ┌50A (50)
┌─────────────────────────┐
│      USING ONLY IMU     │
│                         │
│    CURRENT MOVEMENT     │
│      AMOUNT: ○○○        │
└─────────────────────────┘
```

FIG.6B

```
                              ┌50B (50)
┌─────────────────────────┐
│  USING IMU AND EXTERNAL │
│          SENSOR         │
│                         │
│    CURRENT MOVEMENT     │
│      AMOUNT: ○○○        │
└─────────────────────────┘
```

INFORMATION PROCESSING DEVICE AND METHOD

CROSS-REFERENCE TO RELATED APPLICATIONS

This application is based upon and claims the benefit of priority from Japanese Patent Application No. 2016-117705, filed on Jun. 14, 2016; the entire contents of which are incorporated herein by reference.

FIELD

Embodiments described herein relate generally to an information processing device and an information processing method.

BACKGROUND

There is known a technique for calculating a current movement amount of a moving object. For example, JP-A 2014-222550 (KOKAI) discloses a technique for calculating a traveled course and a traveled distance by using information provided by an inertial sensor and information obtained from a camera.

BRIEF DESCRIPTION OF THE DRAWINGS

FIGS. 4A to 4C are explanatory diagrams illustrating the derivation of the second movement amount;

FIGS. 6A and 6B are schematic views illustrating examples of output information;

DETAILED DESCRIPTION

According to an embodiment, an information processing device includes an internal sensor, a first derivation unit, a second derivation unit, a reliability calculation unit, a movement amount calculation unit. The internal sensor monitors monitor information including acceleration of a moving object. The first derivation unit derives a first movement amount of the moving object from the monitor information. The second derivation unit derives a second movement amount of the moving object using surrounding information of the moving object monitored by an external sensor. The reliability calculation unit calculates reliability of the second movement amount. The movement amount calculation unit calculates a current movement amount of the moving object using the first movement amount and the second movement amount when the reliability meets a specific criterion, and calculates the first movement amount as the current movement amount when the reliability does not meet the specific criterion.

The following describes an information processing device and an information processing method in detail with reference to accompanying drawings.

Figure 1:
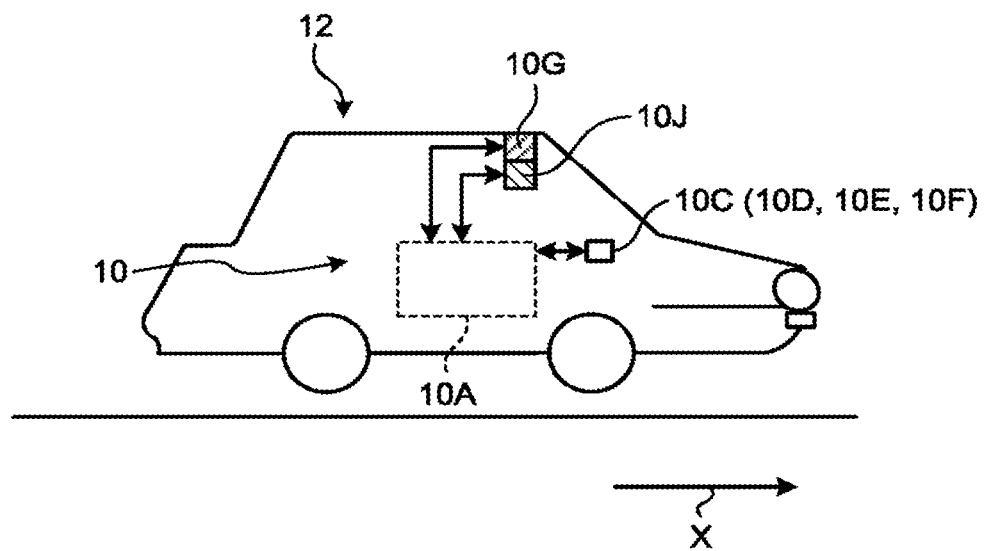
FIG. 1 is a diagram illustrating an example of an information processing device.

FIG. 1 is a diagram illustrating an example of an information processing device 10 of an embodiment. The information processing device 10 calculates a current movement amount of a moving object.

The embodiment describes a case in which the information processing device 10 is mounted on a moving object 12 as an example.

The moving object 12 is a movable object. In the example illustrated in FIG. 1, the moving object 12 travels in the direction of arrow X. Examples of the moving object 12 include an automobile, a truck, a flying object (manned or unmanned aerial vehicle such as a drone), and a robot. The embodiment describes a case in which the moving object 12 is an automobile. The automobile includes a two-wheeled automobile, a three-wheeled automobile, and a four-wheeled automobile. The embodiment describes a case in which the automobile is the four-wheeled automobile as an example.

A movement amount of the moving object 12 includes at least one of a change amount of velocity, a change amount of acceleration, a change amount of orientation, and a change amount of position (travel distance) of the moving object 12. The change amount of position is represented by, for example, a translation vector. The change amount of orientation can be represented by, for example, a rotation matrix, roll, pitch, and yaw angles, a rotation vector, Euler angles, and a quaternion. The embodiment describes a case in which the movement amount is represented by the change amount of position of the moving object 12 and the change amount of orientation of the moving object 12, as an example.

The information processing device 10 includes a processing circuit 10A, an output circuit 10C, an external sensor 10G, and an internal sensor 10J.

The internal sensor 10J is a sensor for monitoring monitor information. The internal sensor 10J is mounted on the moving object 12 the movement amount of which is subject to calculation. Thus, the internal sensor 10J is independent of the environment around the moving object 12, and monitors the monitor information in a stable manner regardless of variations in the environment.

The monitor information is information that includes at least one of acceleration of the moving object 12, velocity of the moving object 12, and angular velocity of the moving object 12.

The internal sensor 10J is, for example, an inertial measurement unit (IMU), an acceleration sensor, a velocity sensor, or a rotary encoder.

The embodiment describes a case in which the internal sensor 10J is the IMU as an example. Accordingly, in the embodiment, the internal sensor 10J monitors the monitor information including three-axis acceleration and three-axis angular velocity of the moving object 12.

The external sensor 10G monitors surrounding information of the moving object 12. The external sensor 10G may be mounted on the moving object 12 the movement amount of which is subject to calculation or mounted on an external of the moving object 12 such as on another moving object and on an external device.

The surrounding information is information indicating a status of surroundings including information around the moving object 12 the movement amount of which is subject to calculation. The surroundings of the moving object 12 the movement amount of which is subject to calculation is a region within a predetermined range from the moving object 12. The range is a range that can be monitored by the external sensor 10G. The range may be set in advance.

Specifically, the surrounding information is at least one of a photographic image and distance information of a periphery of the moving object 12. The surrounding information may include position information of the moving object 12. The photographic image is image data obtained by photographing (Hereinafter simply referred to a photographic image). The distance information is information indicating a distance from the moving object 12 to a target. The target is an external point that can be monitored by the external sensor 10G. The position information may use relative positioning or absolute positioning.

The external sensor 10G is, for example, a photographing device with which a photographic image is obtained by photographing, a distance sensor (millimeter wave radar, laser sensor, distance image sensor), and a position sensor (global navigation satellite system (GNSS), radio communication device).

The embodiment describes a case, as an example, in which the external sensor 10G is the photographing device with which a photographic image is obtained as surrounding information.

The external sensor 10G monitors the surrounding information at each predetermined timing and outputs the monitored surrounding information sequentially to the processing circuit 10A. The internal sensor 10J likewise monitors the monitor information at each predetermined timing and outputs the monitored monitor information sequentially to the processing circuit 10A. The timing of the external sensor 10G monitoring and outputting the surrounding information to the processing circuit 10A and the timing of the internal sensor 10J monitoring and outputting the monitor information to the processing circuit 10A may or may not always be the same. When different timings are included, the surrounding information and the monitor information may be monitored and output to the processing circuit 10A at the same timing at least at a predetermined interval.

The embodiment describes a case, as an example, in which the external sensor 10G and the internal sensor 10J respectively monitor the surrounding information and the monitor information at the same timings and outputs the information to the processing circuit 10A at the same timings.

The processing circuit 10A calculates a current movement amount of the moving object 12 using the surrounding information (a photographic image is used in the embodiment) monitored by the external sensor 10G and the monitor information monitored by the internal sensor 10J. The details of the processing circuit 10A are described further below.

The output circuit 10C outputs output information. The output information includes information relating to the current movement amount of the moving object 12. The details of the output information are described further below.

The output circuit 10C includes a display function for displaying output information, a sound output function for outputting sound indicating the output information, and a communication function for transmitting the output information. For example, the output circuit 10C includes a communication circuit 10D, a display device 10E, and a speaker 10F. In the embodiment, the output circuit 10C is preferably provided in a position from which the output information can be output to the driver of the moving object 12.

The communication circuit 10D transmits information such as the output information to another device. For example, the communication circuit 10D transmits the output information to a terminal device carried by the driver of the moving object 12 through a known communication line. The display device 10E displays output information. The display device 10E is, for example, a known liquid crystal display (LCD), a projection device, and a lighting device. The speaker 10F outputs a sound indicating the output information.

Figure 2:
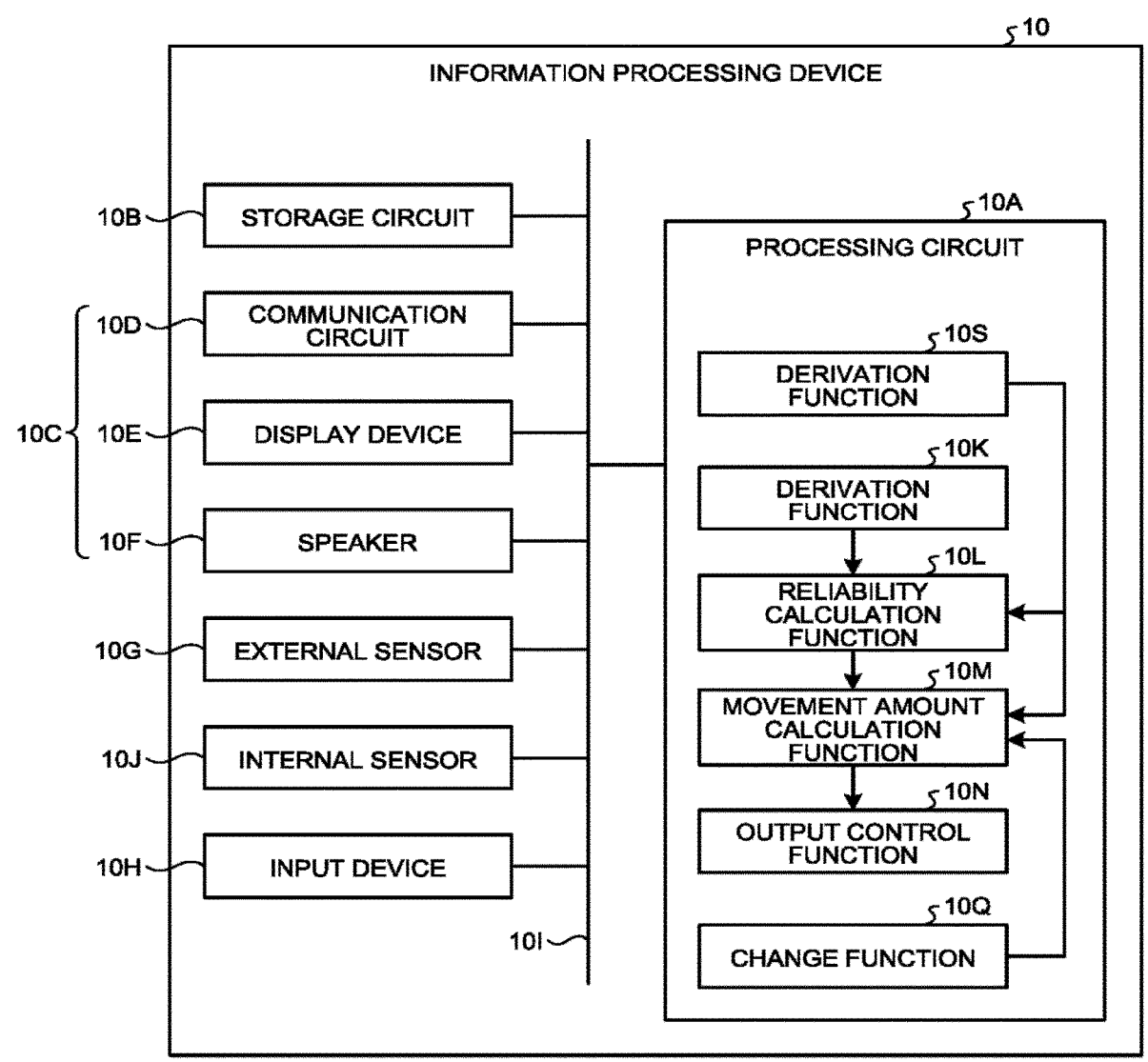
FIG. 2 is a block diagram illustrating a configuration example of the information processing device.

The following describes a configuration of the information processing device 10 in detail. FIG. 2 is a block diagram illustrating a configuration example of the information processing device 10.

The information processing device 10 is, for example, a special or general-purpose computer. The information processing device 10 includes the processing circuit 10A, a storage circuit 10B, the output circuit 10C, the external sensor 10G, the internal sensor 10J, and an input device 10H. The output circuit 10C includes, as described above, the communication circuit 10D, the display device 10E, and the speaker 10F.

The processing circuit 10A, the storage circuit 10B, the output circuit 10C, the external sensor 10G, the internal sensor 10J, and the input device 10H are connected through a bus 10I.

The storage circuit 10B, the output circuit 10C (communication circuit 10D, display device 10E, and speaker 10F), the external sensor 10G, the internal sensor 10J, and the input device 10H may be connected wirelessly or wired to the processing circuit 10A. At least one of the storage circuit 10B, the output circuit 10C (communication circuit 10D, display device 10E, and speaker 10F), the external sensor 10G, the internal sensor 10J, and the input device 10H may be connected to the processing circuit 10A via a network.

As described above, at least the internal sensor 10J needs to be mounted on the moving object 12 the movement amount of which is subject to calculation. Meanwhile, at least one of the other components (processing circuit 10A, storage circuit 10B, output circuit 10C (communication circuit 10D, display device 10E, and speaker 10F), external sensor 10G, and input device 10H), except for the internal sensor 10J, may be mounted on an external of the moving object 12.

The embodiment describes a case, as an example, in which the processing circuit 10A, the storage circuit 10B, the output circuit 10C, the external sensor 10G, the internal sensor 10J, and the input device 10H are mounted on the moving object 12.

The input device 10H receives various instructions and information input from a user. The input device 10H is, for example, a pointing device such as a mouse and a trackball, or an input device such as a keyboard.

The storage circuit 10B stores therein various data. The storage circuit 10B is, for example, a semiconductor memory element such as a random access memory (RAM) and a flash memory, a hard disk, and an optical disk. The storage circuit 10B may be a storage device provided in an external of the information processing device 10. The storage circuit 10B may be a storage medium. Specifically, the storage medium may be the storage medium that stores or temporarily stores therein computer programs or various information downloaded via a local area network (LAN) or the Internet. The storage circuit 10B may include a plurality of storage media.

The following describes the processing circuit 10A. The processing circuit 10A includes a derivation function 10K, a derivation function 10S, a reliability calculation function 10L, a movement amount calculation function 10M, an output control function 10N, and a change function 10Q.

Each processing function of the processing circuit 10A is stored in the storage circuit 10B in a form of a computer program that can be executed by a computer. The processing circuit 10A is a processor that implements functions corresponding to the computer programs by reading the computer programs from the storage circuit 10B and executing the computer programs.

Once each computer program is read, the processing circuit 10A has each function indicated in the processing circuit 10A in FIG. 2. FIG. 2 describes a case in which a single processing circuit 10A implements the derivation function 10K, the derivation function 10S, the reliability calculation function 10L, the movement amount calculation function 10M, the output control function 10N, and the change function 10Q.

A plurality of separate processors for implementing corresponding functions may be combined to constitute the processing circuit 10A. In such a case, each processor executes a computer program to implement individual function. Alternatively, each processing function may be configured as a computer program to be executed by a single processing circuit or specific functions may be implemented in a dedicated and independent computer program execution circuit.

As used in the embodiment, the term "processor" refers to a circuit in, for example, a central processing unit (CPU), a graphical processing unit (GPU), an application specific integrated circuit (ASIC), or a programmable logic device such as a simple programmable logic device (SPLD), a complex programmable logic device (CPLD), and a field programmable gate array (FPGA).

The processor implements a function by reading and executing a computer program stored in the storage circuit 10B. The computer program may be directly incorporated into a processor circuit in place of being stored in the storage circuit 10B. In this case, the processor implements a function by reading and executing a computer program stored in the circuit.

The derivation function 10S is an example of a first derivation unit. The derivation function 10S derives a movement amount of the moving object 12 using the monitor information monitored by the internal sensor 10J. The movement amount derived by the derivation function 10S is referred to as a first movement amount herein.

The first movement amount indicates the amount by which the moving object 12 travels during a period from the timing at which the monitor information used to derive the last first movement amount is monitored to the timing at which the monitor information used to derive the current first movement amount is monitored. The first movement amount may be the movement amount of the moving object 12 per unit time at the timing when the monitor information used to derive the current first movement amount is monitored.

In the embodiment, the derivation function 10S derives the first movement amount including a change amount of position of the moving object 12 and a change amount of orientation of the moving object 12, from the monitor information monitored by the internal sensor 10J.

In the embodiment, as described above, the internal sensor 10J monitors the monitor information including three-axis acceleration and three-axis angular velocity of the moving object 12. The accelerations in x-axis, y-axis, and z-axis included in the monitor information is respectively defined as $a_x$, $a_y$, and $a_z$. The angular velocities in x-axis, y-axis, and z-axis included in the monitor information is respectively defined as $\omega_x$, $\omega_y$, and $\omega_z$. The acceleration vector a indicating the accelerations in the three axes is represented by Expression (1). The angular velocity vector $\omega$ indicating the angular velocities in the three axes is represented by Expression (2). In Expressions1 (1) and (2), T represents a transpose operator.

$$a=(a_x,a_y,a_z)^T \quad (1)$$

$$\omega=(\omega_x,\omega_y,\omega_z)^T \quad (2)$$

The velocity vector v indicating the velocities in the three axes (x-axis, y-axis, and z-axis) is represented by $v=(v_x, v_y, v_z)^T$. Accordingly, a change amount of position $\delta t_2$ of the moving object 12, a change amount of orientation $\delta r_2$ of the moving object 12, and a change amount of velocity $\delta v_2$ of the moving object 12 can be calculated by Expressions (3) to (5), respectively.

$$\delta t_2 = v\tau + \tfrac{1}{2}g\tau^2 + \tfrac{1}{2}a\tau^2 \quad (3)$$

$$\delta r_2 = \omega\tau \quad (4)$$

$$\delta v_2 = g\tau + a\tau^2 \quad (5)$$

In Expressions (3) to (5), $\tau$ indicates time and g indicates gravity acceleration.

A predetermined unit of time may be used for $\tau$. More specifically, in the case in which the first movement amount is calculated by using a movement amount of the moving object 12 per unit time, the unit time thereof may be used as $\tau$. In the case in which the first movement amount is calculated by using a period from the last timing of monitoring the monitor information to the current timing of monitoring the monitor information, the period thereof may be used as $\tau$.

The derivation function 10S derives, by calculating Expressions (3) to (5), the first movement amount including the change amount of position $\delta t_2$ of the moving object 12, the change amount of orientation $\delta r_2$ of the moving object 12, and the change amount of velocity $\delta v_2$ of the moving object 12.

The following describes the derivation function 10K. The derivation function 10K is an example of a second derivation unit. The derivation function 10K derives a movement amount of the moving object 12 using surrounding information monitored by the external sensor 10G. The movement amount of the moving object 12 derived by the derivation function 10K is referred to as a second movement amount herein.

The second movement amount indicates the amount by which the moving object 12 travels during a period from the timing at which the surrounding information used to derive the last second movement amount is monitored to the timing at which the surrounding information used to derive the current second movement amount is monitored. The period is the same as that indicated by the first movement amount. The second movement amount may be the movement amount of the moving object 12 per unit time at the timing at which the surrounding information used to derive the current second movement amount is monitored.

In the embodiment, the derivation function 10K derives the second movement amount including the change amount of position of the moving object 12 and the change amount of orientation of the moving object 12, from the surrounding information monitored by the external sensor 10G.

The derivation function 10K derives the second movement amount of the moving object 12 using two pieces of surrounding information monitored at different timings by the external sensor 10G.

Suppose, for example, that the derivation function 10K derives the second movement amount of the moving object 12 at the first timing. In this case, the derivation function 10K derives the second movement amount of the moving object 12 at the first timing by using the surrounding information monitored at the first timing and the surrounding information monitored the second timing.

The first timing and the second timing may be any timing as long as they are different from each other. The second timing may be before the first timing (in the past) or after the first timing (in the future).

When the second timing is after the first timing (in the future), the derivation function 10K stores, in advance, a plurality of pieces of monitor information monitored at different timings in the storage circuit 10B or any other storage medium. The derivation function 10K reads any two pieces of monitor information from the monitor information and uses one piece of the information as the monitor information at the first timing and the other piece of the information as the monitor information at the second timing.

The derivation function 10K derives the second movement amount of the moving object 12 at the first timing by using the surrounding information monitored at the first timing and the surrounding information monitored at the second timing.

More specifically, the derivation function 10K detects object points in the surrounding information monitored at the first timing. The object points are points in the surrounding information monitored by the external sensor 10G. The object points include, for example, feature points representing distinctive regions. The feature points are points that identify boundaries between regions in which at least one of luminance, color, and distance therebetween differs by a predetermined value or more. The feature points are, for example, edges in which luminance changes drastically, and corners in which black points of a line segment or edges bend sharply. The object points may be any portions (points) in the surrounding information and are not limited to the feature points.

Figure 3:
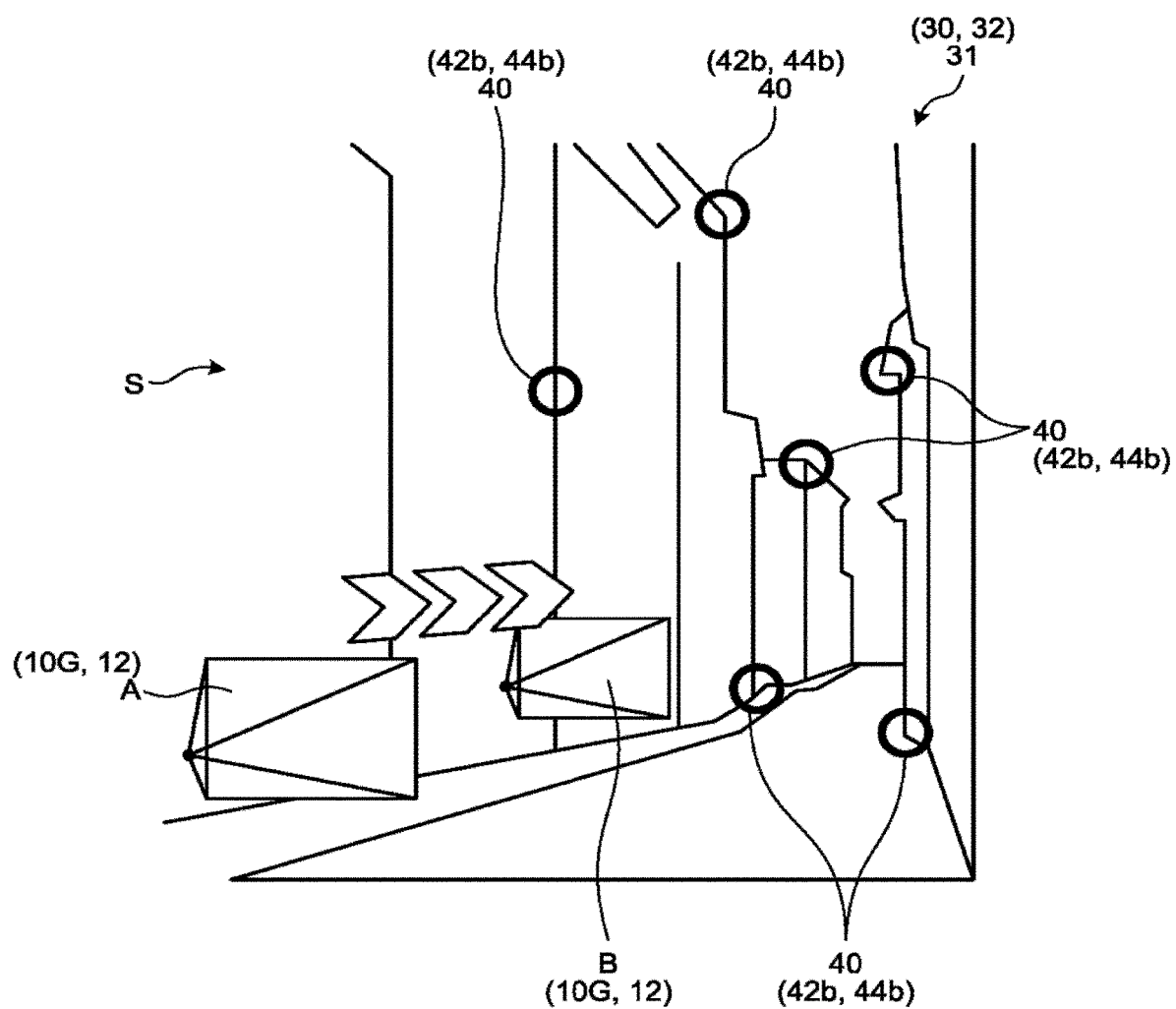
FIG. 3 is an explanatory diagram illustrating derivation of a second movement amount.

FIG. 3 is an explanatory diagram illustrating derivation of the second movement amount. Suppose, for example, that the moving object 12 bearing the external sensor 10G travels from a position A to a position B in a three-dimensional space S, as illustrated in FIG. 3, and that the external sensor 10G monitors surrounding information 31 at the timing of the position B (the first timing) and at the timing of the position A (the second timing). The following describes a case in which the derivation function 10K derives the second movement amount from the position A to the position B.

In this case, the external sensor 10G monitors the surrounding information 31 including various object points 40 by monitoring a real space. The object points 40 include feature points such as edges and corners as described above. The derivation function 10K detects the object points 40 included in the surrounding information 31 to derive the second movement amount.

The derivation function 10K derives the second movement amount of the moving object 12 at the first timing using an error between the object points 40 in the surrounding information 31 monitored at the first timing and estimation points that are the estimated object points 40 at the first timing estimated using the surrounding information 31 monitored at the second timing.

The description will be given in detail below. FIGS. 4A to 4C are explanatory diagrams illustrating the derivation of the second movement amount in the case in which the surrounding information 31 is a photographic image 30.

FIG. 4A is an example of the photographic images 30A and 30B monitored by the external sensor 10G. The photographic image 30B is an example of the photographic image monitored at the first timing at the position B (Refer to FIG. 3). The photographic image 30A is an example of the photographic image 30 monitored at the second timing at the position A ahead of the position B (Refer to FIG. 3).

The derivation function 10K detects object points 42b in the photographic image 30B monitored at the first timing.

The derivation function 10K detects points that indicate edges and corners, as object points 42b, in the photographic image 30B monitored at the first timing by a known image processing technique. For example, the derivation function 10K detects the object points 42b through corner detection by the Harris operator and edge detection by the Kirsch operator.

Subsequently, the derivation function 10K searches for corresponding points 42a that correspond to the object points 42b described above in the photographic image 30A monitored at the second timing different from the first timing (Refer to FIG. 4A).

A known method may be used to find the corresponding points 42a in the photographic image 30A that correspond to the object points 42b in the photographic image 30B. For example, the derivation function 10K may search for the corresponding points 42a by mapping image patches through template matching. The derivation function 10K may use, for example, the speeded up robust features (SURF), the scale invariant feature transform (SIFT), and the accelerated KAZE (AKAZE) to find the corresponding points 42a each feature amount of which matches or is similar to that of the object points 42b in the photographic image 30B.

Subsequently, the derivation function 10K derives the second movement amount by using the object points 42b detected from the photographic image 30B of the first timing and the corresponding points 42a found in the photographic image 30A of the second timing.

For example, the derivation function 10K derives the second movement amount by using a technique using the essential matrix estimation. Described in the embodiment is an example that uses a five-point algorithm. The five-point algorithm requires five or more pairs of an object point 42b and a corresponding point 42a. The essential matrix is a matrix that includes a relation of position and orientation between the external sensor 10G at the first timing and the external sensor 10G at the second timing. In other words, the essential matrix represents the relation between the position of the object points 42b in the photographic image 30B monitored at the first timing and the position of the corresponding points 42a in the photographic image 30A monitored at the second timing.

The technique based on the essential matrix performs singular value decomposition to estimate an essential matrix that satisfies a plurality of pairs of an object point 42b and a corresponding point 42a and calculates, using the result of the singular value decomposition obtained in the course of estimation, a translation vector $\delta t_1$ and a rotation matrix $\delta R_1$ that respectively indicate the change amount of position and the change amount of orientation of the external sensor 10G at the first timing.

The description is given in detail below with reference to FIGS. 4A to 4C. The derivation function 10K then projects object points 42b detected from the photographic image 30B of the first timing and corresponding points 42a found in the photographic image 30A of the second timing to a three-dimensional virtual space S' in which the external sensor 10G is arranged (Refer to FIG. 4B). The difference between the object point 42b and its corresponding point 42a in the three-dimensional virtual space S' indicates a projection error 42D illustrated in FIG. 4B.

In the derivation function 10K, the external sensors 10G are arranged in the three-dimensional virtual space S' at two predetermined positions with each of the external sensors 10G set in a predetermined orientation.

The derivation function 10K performs triangulation by using the position and the orientation of the two external sensors 10G arranged in the three-dimensional virtual space S' to calculate a three-dimensional position of each object point 42b in the photographic image 30B and each corresponding point 42a in the photographic image 30A in the three-dimensional virtual space S'.

The derivation function 10K then projects, again, the corresponding points 42a in the three-dimensional virtual space S' to the photographic image 30B as the corresponding object points 42b'.

Accordingly, the derivation function 10K determines the object points 42b in the photographic image 30B at the first timing and the estimation points 42b', which are the object points 42b estimated using the photographic image 30A monitored at the second timing.

The derivation function 10K repeats projection to the three-dimensional virtual space S' and reprojection to the photographic image 30B until a reprojection error 42D', which is the difference between the object points 42b and corresponding estimation points 42b' in the photographic image 30B, becomes equal to or smaller than a set value while changing the orientation and the position of the external sensors 10G in the three-dimensional virtual space S' (Refer to FIG. 4C).

The set value may be defined in advance. A plurality of pairs of an object point 42b and a corresponding point 42a exist in the photographic images 30A and 30B. Thus, the derivation function 10K may repeat the projection and reprojection until the largest reprojection error 42D' among the reprojection errors 42D' of the pairs of a corresponding point 42a and an object point 42b becomes equal to or smaller than the set value. Alternatively, the derivation function 10K may repeat the projection and reprojection until the average of the reprojection errors 42D' of the pairs of a corresponding point 42a and an object point 42b becomes equal to or smaller than the set value.

The derivation function 10K then derives, as the second movement amount, the amount of change in the position and the orientation of the external sensor 10G at the first timing with respect to the position and the orientation of the external sensor 10G at the second timing, which are set at the point where the reprojection error 42D' becomes equal to or smaller than the set value.

As used herein, the reprojection error 42D' that is equal to or smaller than the set value is referred to as an error 47. That is, the error 47 indicates the reprojection error 42D' used by the derivation function 10K to derive the second movement amount. Here, the reprojection error is calculated by using the initial second movement based on the essential matrix and refines the second movement amount. The reprojection error can be also calculated by using the first movement amount as the initial value of the second movement amount.

The change amount of the position and the change amount of the orientation of the external sensor 10G at the first timing with respect to the position and the orientation of the external sensor 10G at the second timing, which are set at the time point where the reprojection error 42D' becomes equal to or smaller than the set value, are respectively represented by a translation vector $\delta t_1$ and a rotation matrix $\delta R_1$. Accordingly, the derivation function 10K converts the rotation matrix $\delta R_1$, which indicates the change amount of orientation, to roll, pitch, and yaw angles. The derivation function 10K then derives, as the second movement amount, the change amount of position $\delta t_1$ represented by the translation vector and the change amount of orientation $\delta r_1$ represented by roll, pitch, and yaw angles.

The following describes a method for deriving the second movement amount in the case in which the surrounding information 31 monitored by the external sensor 10G is distance information 32.

Figure 5A:
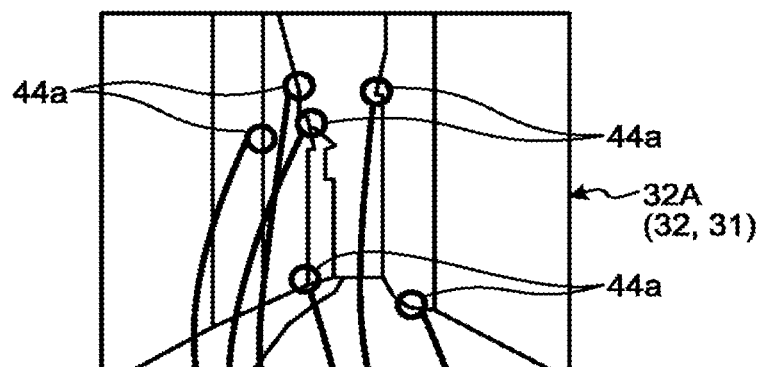
FIGS. 5A and 5B are explanatory diagrams illustrating the derivation of the second movement amount.
Figure 5B:
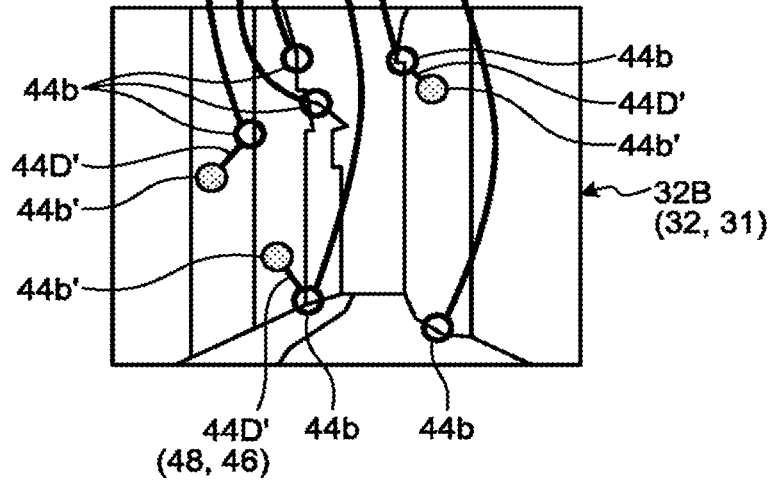

FIGS. 5A and 5B are explanatory diagrams illustrating the derivation of the second movement amount in the case in which the surrounding information 31 is the distance information 32. FIGS. 5A and 5B illustrate a case, as an example, in which the distance information 32 is a distance image that defines a distance from the external sensors 10G for each pixel.

Distance information 32B illustrated in FIG. 5B is an example of the distance information 32 monitored at the first timing at the position B (Refer to FIG. 3). Distance information 32A illustrated in FIG. 5A is an example of the distance information 32 monitored at the second timing at the position A ahead of the position B (Refer to FIG. 3).

The derivation function 10K detects object points 44b in the distance information 32B monitored at the first timing (Refer to FIG. 5B). The object points 44b are detected in the same manner as in the detection of the object points 42b. Subsequently, the derivation function 10K finds corresponding points 44a that correspond to the object points 44b described above in the distance information 32A monitored at the second timing different from the first timing (Refer to FIG. 5A). The corresponding points 44a may be found in the same manner that the corresponding points 42a are found.

The distance information 32A and 32B is the information indicating the distance in a three-dimensional space. Accordingly, the derivation function 10K places the corresponding points 44a of the distance information 32A in the distance information 32B, identifies differences between the placed corresponding points 44a and the corresponding object points 44b, and determines estimation points 44b' of the corresponding object points 44b on the basis of the differences.

The derivation function 10K then derives an estimation error 44D' between the object points 44b and the estimation points 44b'. More specifically, the derivation function 10K derives the error between the object points 44b and the estimation points 44b', the object points 44b being in the distance information 32B monitored at the first timing and the estimation points 44b' being estimated using the corresponding points 44a, which correspond to the object points 44b, in the distance information 32A monitored at the second timing.

Once the estimation error 44D' is represented by the translation vector $\delta t_1$ and the rotation matrix $\delta R_1$, the derivation function 10K converts the rotation matrix $\delta R_1$ to roll, pitch, and yaw angles. The derivation function 10K then derives, as the second movement amount, the change amount of position $\delta t_1$ represented by a translation vector and the change amount of orientation $\delta r_1$ represented by roll, pitch, and yaw angles.

There may be a case in which a plurality of pairs of an object point 44*b* and an estimation point 44*b*' are configured as determined by the distance information 32A and 32B. In this case, the derivation function 10K may use the largest estimation error 44D' among the estimation errors 44D' of the pairs of an object point 44*b* and an estimation point 44*b*' to derive the second movement amount. Alternatively, the derivation function 10K may use an average of the estimation errors 44D' of the pairs of an object point 44*b* and an estimation point 44*b*' to derive the second movement amount.

As used herein, the estimation error 44D' used by the derivation function 10K to derive the second movement amount is referred to as an error 48.

The error 48, the estimation error 44D' used by the derivation function 10K to derive the second movement amount using the distance information 32, and the error 47, the reprojection error 42D' used by the derivation function 10K to derive the second movement amount using the photographic images 30, may be collectively referred to as an error 46 herein.

The description continues with reference to FIG. 2 again.

The monitor information monitored by the internal sensor 10J is independent of the environment around the moving object 12 as described above. On the other hand, the surrounding information 31 monitored by the external sensor 10G is dependent on the environment around the moving object 12. When the moving object 12 travels in the location in which an external communication error may easily occur, for example, inside a tunnel, the processing circuit 10A may have difficulty in obtaining the surrounding information 31 from the external sensor 10G. When the moving object 12 travels in darkness with the brightness level less than a predetermined value, the processing circuit 10A may not be able to obtain the surrounding information 31 that is sufficient to accurately search for the object points 40. Likewise, when the moving object 12 travels in brightness with the brightness level equal to or greater than a predetermined value, the processing circuit 10A may not be able to obtain the surrounding information 31 that is sufficient to accurately search for the object points 40.

Therefore, the accuracy of calculation may be decreased if the current movement amount of the moving object 12 is calculated by simply using the second movement amount derived from the surrounding information monitored by the external sensor 10G and the first movement amount derived from the monitor information monitored by the internal sensor 10J.

Accordingly, the reliability calculation function 10L calculates reliability of the second movement amount. More specifically, the reliability calculation function 10L calculates the reliability of the second movement amount derived by the derivation function 10K. Reliability means the accuracy of the second movement amount. A higher reliability means a higher accuracy of the second movement amount is (that is, the second movement amount is closer to the amount by which the moving object 12 has traveled in real life).

The reliability calculation function 10L calculates the reliability of the second movement amount using at least one of the error 46 mentioned above, the difference between the first and the second movement amount, and the number of times that the external sensor 10G has succeeded in obtaining the surrounding information successively.

The following describes a method for calculating the reliability using the error 46.

The error 46 includes, as described above, the reprojection error 42D' used to derive the second movement amount (error 47, refer to FIG. 4C) and the estimation error 44D' used to derive the second movement amount (error 48, refer to FIG. 5B).

The reliability calculation function 10L, for example, calculates reliability using the error 46 (error 47, error 48) between the object points 40 (object points 42*b*, object points 44*b*) in the surrounding information 31 (photographic image 30, distance information 32) at the first timing used to derive the second movement amount and the object points 40 (object points 42*b*, object points 44*b*) estimated as the estimation points (estimation points 42*b*', estimation points 44*b*') using the surrounding information 31 (photographic image 30, distance information 32) monitored at the second timing.

Specifically, the reliability calculation function 10L reads a plurality of errors 46 between a plurality of object points 40 (object points 42*b*, object points 44*b*) in the surrounding information 31 (photographic image 30, distance information 32) at the first timing used to derive the second movement amount and the corresponding estimation points (estimation points 42*b*', estimation points 44*b*'). More specifically, the reliability calculation function 10L reads a plurality of reprojection errors 42D' or a plurality of estimation errors 44D' as a plurality of errors 46. The reliability calculation function 10L then counts the number of the errors 46 that satisfy a specific condition. The reliability calculation function 10L then calculates the number as the reliability of the second movement amount at the first timing.

The specific condition may be defined in advance. The specific condition, for example, is that the value of the error 46 (reprojection error 42D', estimation error 44D') is equal to or less than a reference value. In this case, the reliability calculation function 10L counts, as the reliability, the number of the errors 46 between the object points 40 and the corresponding estimation points the value of which is less than the reference value.

Alternatively, the specific condition may be that the difference between the object points 40 and the corresponding estimation points in the feature amount is equal to or less than a reference value. In this case, the reliability calculation function 10L derives the feature amount for each of the object points 40 and the corresponding estimation points. The reliability calculation function 10L may calculate, as the reliability, the number of pairs of an object point 40 and an estimation point that have the difference in the feature amount being equal to or lower than the reference value.

A feature amount for each of object points 40 and estimation points may be defined in accordance with the edges and corners indicated in each of object points 40 and the estimation points. Specifically, the reliability calculation function 10L derives higher feature amounts for sharper edges indicated in the object points 40 and the estimation points. Likewise, the reliability calculation function 10L derives higher feature amounts for wider corners. The reliability calculation function 10L may take the number of pairs of an object point 40 and a corresponding estimation point that have the difference in the feature amount being equal to or lower than the reference value.

Alternatively, the reliability calculation function 10L may calculate reliability using the difference between the first movement amount and the second movement amount. The reliability calculation function 10L, for example, calculates the reliability by performing subtraction between the first movement amount and the second movement amount.

The reliability calculation function 10L may use the inverse of the difference between the first movement amount and the second movement amount to calculate the reliability. In this case, the reliability calculation function 10L can calculate the reliability by using Expression (6).

$$a = \frac{1}{\|\delta t_1 - \delta t_2\| + \|\delta r_1 - \delta r_2\|} \quad (6)$$

In Expression (6), a represents the reliability. $\delta t_1$, $\delta t_2$, $\delta r_1$, and $\delta r_2$ are as mentioned above.

The reliability calculation function 10L may calculate the reliability by first multiplying the second movement amount and the first movement amount by their respective weighting values and then calculating the difference therebetween.

For example, the reliability calculation function 10L sets the respective predetermined weighting values for the displacement amount of the position and the displacement amount of the orientation included in the movement amount. The reliability calculation function 10L adds the respective predetermined weighting values to the displacement amount of position and the displacement amount of orientation included in the second movement amount, or multiplies the displacement amount of position and the displacement amount of orientation included in the second movement amount by the respective weighting values. Likewise, the reliability calculation function 10L adds respective predetermined weighting values to the displacement amount of position and the displacement amount of orientation included in the first movement amount, or multiplies the displacement amount of position and the displacement amount of orientation included in the first movement amount by the respective predetermined weighting values. The reliability calculation function 10L may use the differences in the displacement amount of position and the displacement amount of orientation, after the respective weighting values added or multiplied, between each pair to determine the reliability.

Alternatively, the reliability calculation function 10L may only use either one of the change amount of position or the change amount of orientation between the first movement amount and the second movement amount to determine the reliability.

The derivation function 10K derives the second movement amount of the moving object 12 each time the surrounding information is obtained from the external sensor 10G. Accordingly, the reliability calculation function 10L may use, as the reliability, the number of times the derivation function 10K has successively obtained the surrounding information from the time it failed to obtain the surrounding information last time until the time it obtained the surrounding information this time.

The following describes the movement amount calculation function 10M. The movement amount calculation function 10M uses the second movement amount and the first movement amount to calculate the current movement amount of the moving object 12 when the reliability of the second movement amount meets a specific criterion. When the reliability of the second movement amount does not meet the specific criterion, the movement amount calculation function 10M uses the first movement amount as the current movement amount of the moving object 12.

Meeting the specific criterion means that the level of reliability of the second movement derived by the derivation function 10K is high enough to be used for the calculation of the current movement amount of the moving object 12.

The specific criterion may be defined in advance according to the type of reliability. As described above, the reliability calculation function 10L uses various methods to calculate the reliability. Thus, different criteria may be set in advance for different types of reliability.

When higher values indicate higher reliability, for example, the movement amount calculation function 10M determines that the reliability meets the specific criterion when the reliability is equal to or higher than a threshold. When lower values indicate higher reliability, the movement amount calculation function 10M determines that the reliability meets the specific criterion when the reliability is equal to or less than a threshold.

In some cases, a value indicating the reliability being in a certain range indicates high reliability. In this case, the movement amount calculation function 10M may determine that the reliability meets the specific criterion when the reliability is within the range.

In other cases, the value indicating the reliability being out of a certain range indicates high reliability. In this case, the movement amount calculation function 10M may determine that the reliability meets the specific criterion when the reliability is out of the range.

The threshold used as the specific criterion can be changed. The change function 10Q changes the threshold. The change function 10Q changes the threshold to the value instructed by a user through the operation of an input device 10H. The change function 10Q may change the threshold in accordance with the error 46 used to derive the second movement amount.

Specifically, the change function 10Q may change the threshold in accordance with the average value or the median value of the error 46 used to derive the second movement amount. The change function 10Q may also change the threshold in accordance with the dispersion of the error 46 or the standard deviation of the error 46. The change function 10Q may also change the threshold in accordance with the maximum value of the error 46 or the minimum value of the error 46.

The movement amount calculation function 10M may use a known technique to calculate the current movement amount of the moving object 12 using the second movement amount and the first movement amount. For example, the movement amount calculation function 10M calculates the current movement amount of the moving object 12 by using, for example, the Gauss-Newton algorithm, the Levenberg-Marquardt algorithm, and the conjugate gradient algorithm.

The following describes an example method in which the movement amount calculation function 10M uses the Gauss-Newton algorithm to calculate the current movement amount of the moving object 12.

Expression (7) represents a current movement amount x subject to the calculation, where $\delta t_3$ indicates a change amount of position and $\delta r_3$ indicates a change amount of orientation. With the Gauss-Newton algorithm, the current movement amount x is calculated by Expression (8).

$$x = (\delta t_3, \delta r_3) \quad (7)$$

$$x \leftarrow x + \Delta x \quad (8)$$

$\Delta x$ represents an update amount. The movement amount calculation function 10M updates the movement amount x by using Expression (8). The movement amount calculation function 10M then repeats to update the update amount $\Delta x$ until the update of the movement amount x converges.

Specifically, the movement amount calculation function 10M determines that the movement amount x has been converged when the update amount Δx or the magnitude of the abovementioned error 46 used to derive the second movement amount becomes equal to or less than a specific value. An error vector indicating the error 46 is referred to as e. The Jacobian matrix J for the error vector e is represented by Expression (9).

$$J = \frac{de}{dx} \tag{9}$$

The update amount Δx can be represented by Expression (10) following the Jacobian matrix J indicated in Expression (9).

$$\Delta x = -(J^T J)^{-1} J^T e \tag{10}$$

The error vector e can be represented by Expressions (11) and (12).

$$e_t = \delta t_3 - \delta t_2 \tag{11}$$

$$e_r = \delta r_3 - \delta r_2 \tag{12}$$

As described above, $\delta t_2$ in Expression (11) represents the change amount of position of the moving object 12 indicated by the first movement amount. $\delta t_3$ in Expression (11) represents the change amount of position of the moving object 12 indicated by the current movement amount of the moving object 12. $\delta r_2$ in Expression (12) represents the change amount of orientation of the moving object 12 indicated by the first movement amount. $\delta r_3$ in Expression (12) represents the change amount of orientation of the moving object 12 indicated by the current movement amount of the moving object 12.

Subsequently, the movement amount calculation function 10M uses Expression (13) to calculate an essential matrix $E_3$ for each change amount of position $\delta t_3$ of the moving object 12 and each change amount of orientation $\delta r_3$ of the moving object 12 in the current movement amount x subject to the calculation.

$$E_3 = \begin{bmatrix} 0 & -t_{3z} & t_{3y} \\ t_{3z} & 0 & -t_{3x} \\ -t_{3y} & t_{3x} & 0 \end{bmatrix} \tag{13}$$

$$\begin{bmatrix} \cos r_{3y}\cos r_{3x} & \sin r_{3z}\sin r_{3y}\cos r_{3x} - \sin r_{3z}\sin r_{3x} + \\ & \cos r_{3z}\sin r_{3x} & \cos r_{3z}\sin r_{3y}\cos r_{3x} \\ \cos r_{3y}\sin r_{3x} & \sin r_{3z}\sin r_{3y}\sin r_{3x} + & -\sin r_{3z}\cos r_{3x} + \\ & \cos r_{3z}\cos r_{3x} & \cos r_{3z}\sin r_{3y}\sin r_{3x} \\ -\sin r_{3y} & \sin r_{3z}\cos r_{3y} & \cos r_{3z}\cos r_{3y} \end{bmatrix}$$

Note that the change amount of position $\delta t_3$ of the moving object 12 and the change amount of orientation $\delta r_3$ of the moving object 12 in the current movement amount x subject to the calculation can be represented by respective Expressions (14) and (15).

$$\delta t_3 = (t_{3x}, t_{3y}, t_{3z})^T \tag{14}$$

$$\delta r_3 = (r_{3x}, r_{3y}, r_{3z})^T \tag{15}$$

The movement amount calculation function 10M uses Expression (16) to calculate object points 40 (object points 42b, object points 44b), uses Expression (17) to calculate corresponding points (corresponding points 42a, corresponding points 44a) corresponding to the object points 40, and uses Expression (18) to calculate the errors 46 between the corresponding pairs of an object point 40 and a corresponding point.

$$p_{1i} = (x_{1i}, y_{1i}, 1)^T \tag{16}$$

$$p_{2i} = (x_{2i}, y_{2i}, 1)^T \tag{17}$$

$$e_{pi} = (E_3 p_{1i})^T p_{2i} \tag{18}$$

In Expressions (16) to (18), i is an index for each object point 40 (object point 42b, object point 44b) and each corresponding point (corresponding point 42a, corresponding point 44a). The number of object points 40 included in the surrounding information 31 (photographic image 30 or distance information 32) monitored at the first timing is defined as n.

Accordingly, by using Expressions (11) to (18), the error vector e can be represented by Expression (19).

$$e = (e_t^T, e_r^T, e_{p1}, e_{p2}, \ldots, e_{pn})^T \tag{19}$$

The movement amount calculation function 10M calculates the current movement amount x of the moving object 12 by using Expression (8).

The movement amount calculation function 10M may add weighting values before calculating the current movement amount of the moving object 12 using the second movement amount and the first movement amount.

For example, the movement amount calculation function 10M defines, in advance, respective weighting values used for the second movement amount and the first movement amount. The movement amount calculation function 10M may use the adjusted values, to or by which the respective predetermined weighting values for the second movement amount and the first movement amount have been added or multiplied, to calculate the current movement amount of the moving object 12.

The movement amount calculation function 10M may also calculate the current movement amount of the moving object 12 by adding the predetermined weighting value to at least one of the change amount of position and the change amount of orientation included in the second movement amount and the first movement amount.

The movement amount calculation function 10M may further calculate at least one of current position, velocity, acceleration, moving direction, planned moving direction, and trajectory of the moving object 12 by using the calculated movement amount. A known method can be used as a method for the calculation.

The following describes the output control function 10N. The output control function 10N is an example of an output control unit. The output control function 10N outputs output information.

The output information includes information relating to the current movement amount of the moving object 12. The output information may be the information indicating the current movement amount of the moving object 12 or the information indicating various values calculated from the current movement amount of the moving object 12, such as the current location of the moving object 12, the direction in which the moving object 12 is currently moving forward, and the current orientation of the moving object 12.

The output information may further include at least one of current position, velocity, acceleration, moving direction, planned moving direction, and trajectory of the moving object 12 calculated by using the current movement amount of the moving object 12.

The output information may include information indicating the method for calculating the current movement amount of the moving object 12 included in the output information. The information indicating the calculation method indicates, for example, whether the current movement amount is calculated by using only the first movement amount derived from the monitor information monitored by the internal sensor 10J. Alternatively, the information indicating the calculation method indicates, for example, whether the current movement amount is calculated by using the first movement amount derived from the monitor information monitored by the internal sensor 10J and the second movement amount derived from the surrounding information monitored by the external sensor 10G.

The output control function 10N generates the output information by applying the current movement amount of the moving object 12 calculated by the movement amount calculation function 10M to the movement amount calculation method in the movement amount calculation function 10M.

The output control function 10N controls the output circuit 10C to output the output information. The output circuit 10C accordingly outputs the output information. More specifically, the communication circuit 10D in the output circuit 10C transmits the output information to an output target, such as a mobile terminal held by the driver of the moving object 12. The output information is, for example, displayed on the display device 10E in the output circuit 10C. The display device 10E illuminates in different colors, strength, and lighting state (illuminated or blinked) for different output information.

The output control function 10N controls the speaker 10F to output sound in accordance with the output information. The sound in accordance with the output information may be a sound indicating the output information or an alarm sound corresponding to the output information.

FIGS. 6A and 6B are schematic views illustrating examples of output information 50 displayed on the display device 10E. FIG. 6A is an example of output information 50A in the case in which the movement amount calculation function 10M calculates the first movement amount as the current movement amount of the moving object 12. In this case, the output information 50A includes, for example, the information that indicates the current movement amount of the moving object 12 is calculated by only using an IMU, that is, the internal sensor 10J, and the information that specifies the current movement amount of the moving object 12.

FIG. 6B is an example of output information 50B in the case in which the movement amount calculation function 10M calculates the current movement amount of the moving object 12 using the second movement amount and the first movement amount. In this case, the output information 50B includes, for example, the information that indicates the current movement amount of the moving object 12 is calculated by using an IMU, that is, the internal sensor 10J, and the external sensor 10G and the information that specifies the current movement amount of the moving object 12.

Figure 7:
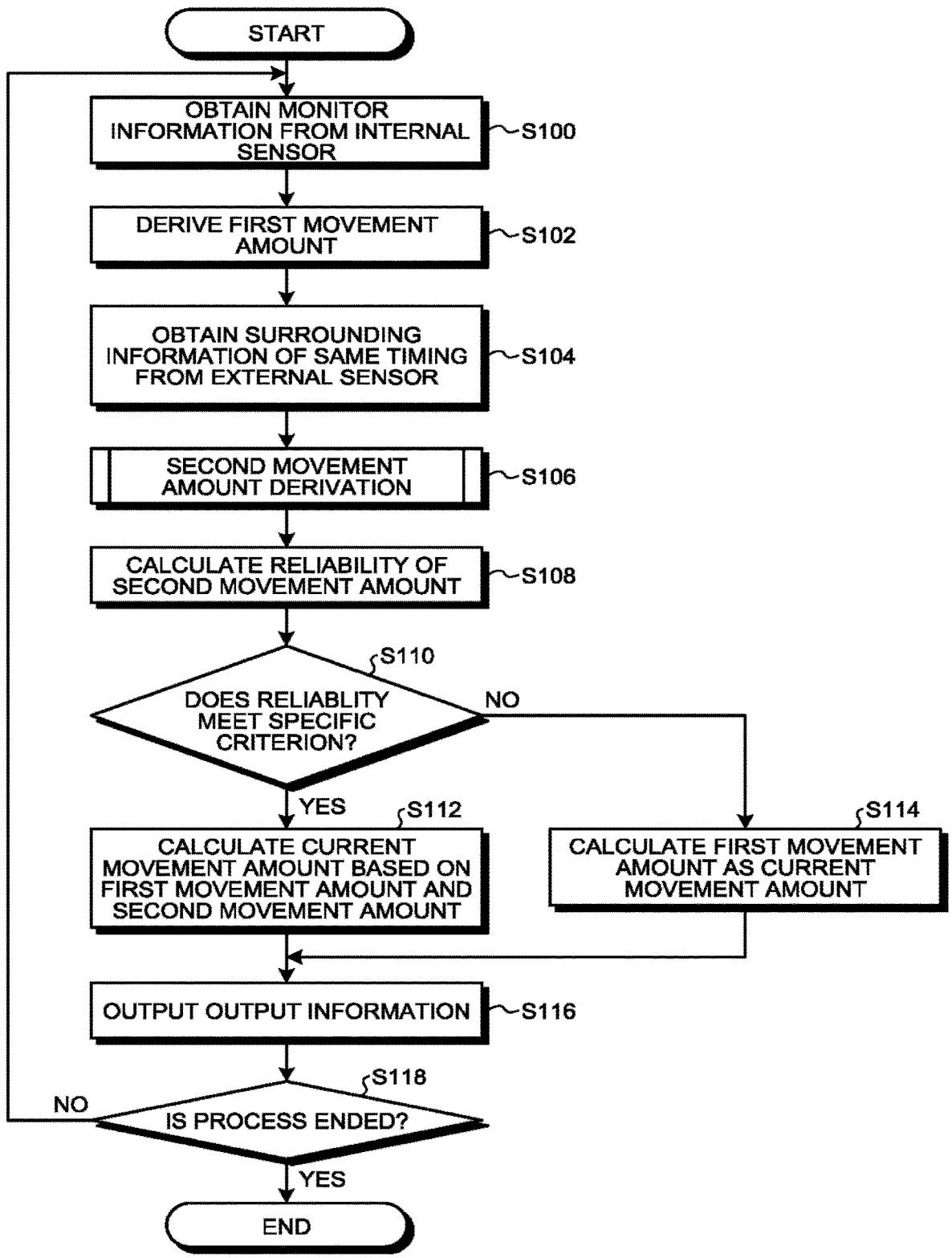
FIG. 7 is a flow chart illustrating an example of a procedure executed by a processing circuit.

The following describes a procedure executed by the processing circuit 10A. FIG. 7 is a flow chart illustrating an example of a procedure executed by the processing circuit 10A.

The derivation function 10S obtains the monitor information from the internal sensor 10J (Step S100). Then, the derivation function 10S derives the first movement amount from the monitor information obtained at Step S100 (Step S102).

Next, the derivation function 10K obtains the surrounding information monitored at the same timing as the timing of Step S100 (Step S104). The derivation function 10K then executes derivation processing in which the second movement amount is derived from the surrounding information obtained at Step S104 (Step S106) (the details are described below).

Next, the derivation function 10K calculates reliability of the second movement amount derived at Step S106 (Step S108). Then, the movement amount calculation function 10M determines whether the reliability calculated at Step S108 meets a specific criterion (Step S110). If the determination is Yes at Step S110 (Yes at Step S110), the process proceeds to Step S112.

At Step S112, the movement amount calculation function 10M calculates the current movement amount of the moving object 12 using the first movement amount derived at Step S102 and the second movement amount derived at Step S106 (Step S112). The process proceeds to Step S116.

If the determination is No at Step S110 (No at Step S110), the process proceeds to Step S114. At Step S114, the movement amount calculation function 10M calculates the first movement amount derived at Step S102 as the current movement amount of the moving object 12 (Step S114).

Next, the output control function 10N outputs, from the output circuit 10C, the output information relating to the current movement amount of the moving object 12 calculated at Step S112 or S114 (Step S116).

Then, the processing circuit 10A determines whether the process should be ended (Step S118). The processing circuit 10A makes a decision at Step S118, for example, by determining whether a signal indicating the end of the process is input by a user through an operation instruction of the input device 10H.

If the determination is No at Step S118 (No at Step S118), the process returns to Step S100. If the determination is Yes at Step S118 (Yes at Step S118), the routine is ended.

Figure 8:
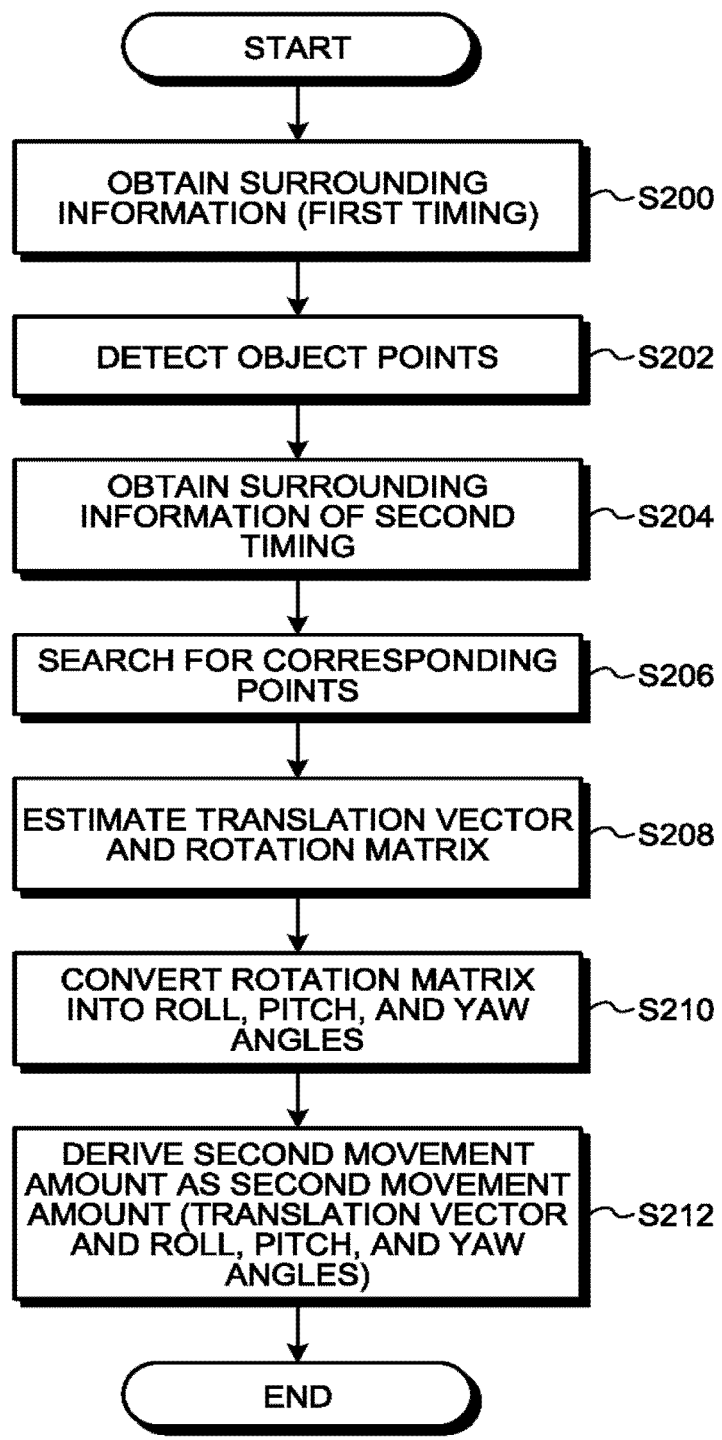
FIG. 8 is a flow chart illustrating an example of a procedure for deriving the second movement amount.

The following describes a procedure of deriving the second movement amount. FIG. 8 is a flow chart illustrating an example of a procedure for deriving the second movement amount at Step S106 (Refer to FIG. 7)

The derivation function 10K obtains the surrounding information 31 monitored at the first timing (Step S200). The surrounding information 31 monitored at the first timing is the surrounding information 31 obtained at Step S104 (Refer to FIG. 7).

Then, the derivation function 10K detects object points 40 in the surrounding information 31 obtained at Step S200 (Step S202).

Next, the derivation function 10K obtains the surrounding information 31 monitored at the second timing different from the first timing (Step S204). The derivation function 10K then searches the surrounding information 31 at the second timing obtained at Step S204 for corresponding points corresponding one-to-one to object points 40 (Step S206).

Next, the derivation function 10K estimates, using the object points 40 detected at Step S202 and the corresponding points found at Step S206, a translation vector that indicates the change amount of position of the external sensor 10G and a rotation matrix that indicates the change amount of orientation of the external sensor 10G at the first timing with respect to the position and the orientation of the external sensor 10G at the second timing (Step S208).

Then, the derivation function 10K converts the rotation matrix indicating the change amount of orientation, which is estimated at Step S208, to roll, pitch, and yaw angles (Step S210). Next, the derivation function 10K uses the change amount of position represented by the translation vector, which is estimated at Step S208, and the change amount of orientation represented by the roll, pitch, and yaw angles, which is derived at Step S210, to derive the second movement amount (Step S212). The routine is then ended.

As described above, the information processing device 10 of the embodiment includes the internal sensor 10J, the derivation function 10S (the first derivation unit), the derivation function 10K (the second derivation unit), the reliability calculation function 10L (reliability calculation unit), and the movement amount calculation function 10M (movement amount calculation unit).

The internal sensor 10J monitors the monitor information of the moving object 12 including acceleration. The derivation function 10S derives the first movement amount of the moving object 12 from the monitor information. The derivation function 10K derives the second movement amount of the moving object 12 using the surrounding information 31 of the moving object 12 monitored by the external sensor 10G. The reliability calculation function 10L calculates reliability of the second movement amount. When the reliability of the second movement amount meets a specific criterion, the movement amount calculation function 10M calculates the current movement amount of the moving object 12 using the second movement amount and the first movement amount. When the reliability of the second movement amount does not meet the specific criterion, the movement amount calculation function 10M uses the first movement amount as the current movement amount of the moving object 12.

In this way, the information processing device 10 according to the embodiment calculates the current movement amount of the moving object 12 using the second movement amount and the first movement amount when the reliability of the second movement amount derived using the surrounding information 31 monitored at the external sensor 10G meets a specific criterion. When the reliability of the second movement amount does not meet the specific criterion, the information processing device 10 uses the first movement amount derived using the monitor information monitored by the internal sensor 10J to calculate the current movement amount of the moving object 12.

With such a configuration, the information processing device 10 according to the embodiment can perform an accurate and stable calculation of the movement amount of the moving object 12 even when accuracy of the surrounding information monitored by the external sensor 10G is low.

As a result, the information processing device 10 according to the embodiment can reduce deterioration in calculation accuracy of the movement amount of the moving object 12.

Figure 9:
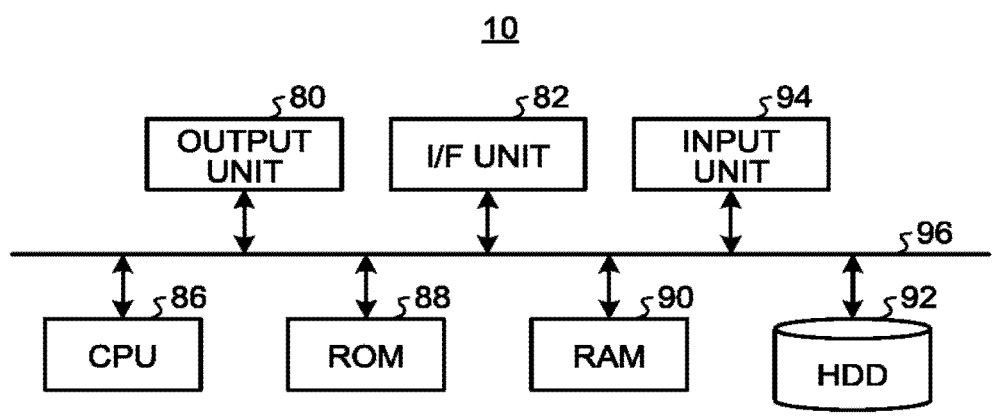
FIG. 9 is a diagram illustrating a hardware configuration.

The following describes an example of a hardware configuration of the information processing device 10 according to the embodiment. FIG. 9 is an example of the hardware configuration of the information processing device 10 according to the embodiment.

The information processing device 10 according to the embodiment includes a control device such as a central processing unit (CPU) 86, a storage device such as a read only memory (ROM) 88, a random access memory (RAM) 90, a hard disk drive (HDD) 92, an I/F unit 82 serving as an interface among various devices, an output unit 80 for outputting various information such as output information, an input unit 94 for accepting operations of a user, and a bus 96 for connecting each unit. Such a hardware configuration of the information processing device 10 is implemented by using a regular computer.

In the information processing device 10 of the embodiment, each of the functions described above is implemented on the computer when the CPU 86 reads computer programs from the ROM 88 and runs the computer programs on the RAM 90.

The computer programs for performing each of the functions described above to be executed on the information processing device 10 of the embodiment may be stored in the HDD 92. The computer programs for performing each of the functions described above to be executed on the information processing device 10 of the embodiment may be provided by being installed in the ROM 88.

The computer programs for performing each of the functions described above to be executed on the information processing device 10 of the embodiment may be provided as computer program products. The computer programs may be stored in a computer-readable storage medium such as a compact disc read only memory (CD-ROM), a compact disc-recordable (CD-R), a memory card, a digital versatile disc (DVD), and a flexible disk (FD) in an installable form or in an executable form. The computer programs for performing each of the functions described above to be executed on the information processing device 10 of the embodiment may be stored in a computer connected to a network, such as the Internet, and provided through downloads via the network. The computer programs for performing each of the functions described above to be executed on the information processing device 10 of the embodiment may be provided or distributed through a network such as the Internet.

While a certain embodiment has been described, the embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. An information processing device comprising:
a memory;
an internal sensor configured to monitor information including acceleration of a moving object; and
processing circuitry configured to operate as:
a first derivation unit configured to derive a first movement amount of the moving object from the monitor information;
a second derivation unit configured to derive a second movement amount of the moving object using surrounding information of the moving object monitored by an external sensor including using an error between an object point, which is used for deriving the second movement amount, in the surrounding information monitored at first timing and an estimation point that is an estimated object point at the first timing using the surrounding information monitored at second timing;
a reliability calculation unit configured to calculate reliability of the second movement amount;
a movement amount calculation unit configured to calculate a current movement amount of the moving object using the first movement amount and the second movement amount when the reliability meets a specific criterion, and to calculate the first movement amount as the current movement amount when the reliability does not meet the specific criterion; and a change unit configured to change the specific criterion in accordance with the error used to derive the second movement amount.

2. The device according to claim 1, wherein
the surrounding information is at least one of a photographic image and distance information of a periphery of the moving object, and
the reliability calculation unit calculates the reliability using the error.

3. The device according to claim 2, wherein the error indicates a reprojection error between the estimation point and the object point, the estimation point being specified by reprojecting to the photographic image monitored at the first timing using at least one of the first movement amount and the second movement amount, the object point in the photographic image monitored at the first timing obtained by corresponding to the object point in the photographic image monitored at the second timing.

4. The device according to claim 2, wherein the error indicates an estimation error between the object point in the distance information monitored at the first timing and the estimation point estimated using a corresponding point corresponding to the object point in the distance information monitored at the second timing.

5. The device according to claim 2, wherein the reliability calculation unit calculates, as the reliability, a number of errors satisfying a specific condition out of a plurality of errors between a plurality of the object points and a plurality of the estimation points.

6. The device according to claim 5, wherein the specific condition is that the error is equal to or less than a reference value.

7. The device according to claim 5, wherein the specific condition is that a difference in a feature amount between the object points and the corresponding estimation points is equal to or less than a reference value.

8. The device according to claim 1, wherein the reliability calculation unit calculates the reliability using a difference between the second movement amount and the first movement amount.

9. The device according to claim 1, wherein
the second derivation unit derives the second movement amount every time the surrounding information is obtained from the external sensor, and
the reliability calculation unit calculates, as the reliability, a number of times the surrounding information is successively obtained from a time the surrounding information is failed to be obtained.

10. The device according to claim 1, wherein the movement amount calculation unit determines that the reliability meets the specific criterion when the reliability is equal to or more than a first threshold, or when the reliability is equal to or less than a second threshold.

11. The device according to claim 1, wherein the device is mounted on the moving object.

12. The device according to claim 1, wherein the external sensor includes at least one of a distance sensor and a photographing device.

13. The device according to claim 1, wherein the internal sensor monitors the monitor information independent of an environment around the moving object.

14. The device according to claim 1, wherein the internal sensor is an inertial measurement unit.

15. The device according to claim 1, further comprising an output control unit configured to output information including information relating to the current movement amount.

16. An information processing method comprising:
deriving a first movement amount of a moving object using monitor information including acceleration of the moving object monitored by an internal sensor;
deriving a second movement amount of the moving object using surrounding information of the moving object monitored by an external sensor including using an error between an object point, which is used for deriving the second movement amount, in the surrounding information monitored at first timing and an estimation point that is an estimated object point at the first timing using the surrounding information monitored at second timing;
calculating reliability of the second movement amount;
calculating a current movement amount of the moving object using the first movement amount and the second movement amount when the reliability meets a specific criterion, and calculating the first movement amount as the current movement amount when the reliability does not meet the specific criterion; and
changing the specific criterion in accordance with the error used to derive the second movement amount.

17. The information processing method according to claim 16, wherein
the surrounding information is at least one of a photographic image and distance information of a periphery of the moving object, and
the reliability is calculated using the error.

18. The information processing method according to claim 17, wherein the error indicates a reprojection error between the estimation point and the object point, the estimation point being specified by reprojecting to the photographic image monitored at the first timing using at least one of the first movement amount and the second movement amount, the object point in the photographic image monitored at the first timing obtained by corresponding to the object point in the photographic image monitored at the second timing.

19. The information processing method according to claim 17, wherein the error indicates an estimation error between the object point in the distance information monitored at the first timing and the estimation point estimated using a corresponding point corresponding to the object point in the distance information monitored at the second timing.

20. The information processing method according to claim 17, wherein as the reliability, a number of errors satisfying a specific condition out of a plurality of the errors between a plurality of the object points and a plurality of the estimation points is calculated.

* * * * *